(12) United States Patent
Yamashita et al.

(10) Patent No.: US 7,330,599 B2
(45) Date of Patent: Feb. 12, 2008

(54) CONTOUR COMPENSATION CIRCUIT, AND A METHOD AND PROGRAM FOR CONTOUR COMPENSATION, AND AN IMAGE SIGNAL DISPLAY DEVICE

(75) Inventors: Takayuki Yamashita, Tokyo (JP); Masayuki Sugawara, Tokyo (JP); Fumio Okano, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 766 days.

(21) Appl. No.: 10/644,802

(22) Filed: Aug. 21, 2003

(65) Prior Publication Data

US 2004/0044424 A1 Mar. 4, 2004

(30) Foreign Application Priority Data

Aug. 27, 2002 (JP) ............................. 2002-247628

(51) Int. Cl.
*G06K 9/40* (2006.01)
*H04N 5/22* (2006.01)
(52) U.S. Cl. .................. 382/266; 382/275; 348/625
(58) Field of Classification Search ............. 382/167, 382/263, 266, 270, 274, 275, 312; 348/226.1, 348/241, 605, 625
See application file for complete search history.

(56) References Cited

U.S. PATENT DOCUMENTS

| | | | | |
|---|---|---|---|---|
| 4,641,183 A | * | 2/1987 | Kinoshita | ................... 348/283 |
| 4,839,725 A | * | 6/1989 | Ueda | ........................... 348/625 |
| 5,303,047 A | * | 4/1994 | Yoshida | ....................... 348/607 |
| 5,329,316 A | * | 7/1994 | Kang | ........................... 348/625 |
| 5,732,160 A | * | 3/1998 | Katoh | .......................... 382/263 |
| 6,559,886 B1 | * | 5/2003 | Miyahara | .................. 348/226.1 |
| 6,677,994 B1 | * | 1/2004 | Kobayashi | ................... 348/252 |

* cited by examiner

*Primary Examiner*—Kanjibhai Patel
(74) *Attorney, Agent, or Firm*—Kratz, Quintos & Hanson, LLP.

(57) ABSTRACT

A contour compensation circuit that generates a contour-compensated signal by which a signal level of a contour of the object is emphasized, from an image signal obtained by an image pickup of an object. This circuit includes a reverse gamma controller, a contour compensation signal generator, and a calculator. The reverse gamma controller determines a standard channel from among the channels constituting the image signal, and obtains a liner standard channel from the standard channel by the reverse control. The contour compensation signal generator generates a contour compensation signal from the liner standard channel. The control signal generator computes a comparative value from the liner standard channel and the contour compensation signal, and generates a control signal based on a comparison between the comparative value and a threshold value. The calculator computes the contour-compensated signal based on the contour compensation and control signals, and the liner standard channel.

8 Claims, 11 Drawing Sheets

FIG.3

| G1 | R | G1 | R | G1 | R | G1 | R |
|----|---|----|---|----|---|----|---|
| B | G2 | B | G2 | B | G2 | B | G2 |
| G1 | R | G1 | R | G1 | R | G1 | R |
| B | G2 | B | G2 | B | G2 | B | G2 |

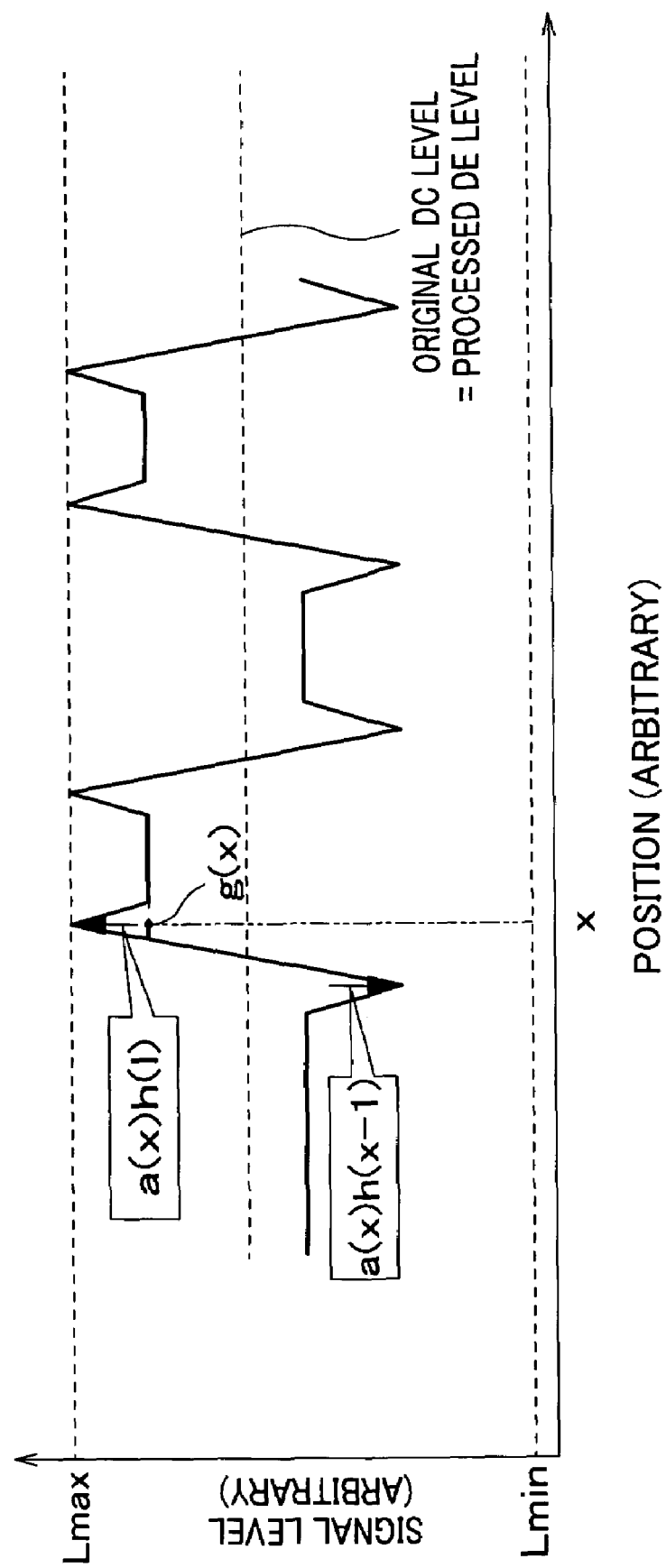

CONTOUR COMPENSATION CIRCUIT, AND A METHOD AND PROGRAM FOR CONTOUR COMPENSATION, AND AN IMAGE SIGNAL DISPLAY DEVICE

BACKGROUND OF THE INVENTION

1. Field of the Invention

The present invention relates to a contour compensation. More specifically, the present invention relates to a method, a program, and a circuit for performing a contour compensation of an object in an image. Additionally, the present invention relates to an image signal display device.

2. Description of Relevant Art

Conventionally, a contour compensation circuit, which strengthen a contour of an object (a contour strengthen object) in an image, as shown in FIG. 10, has a contour compensation signal generator, a retarder, and an accumulator.

The contour compensation signal generator consisting of high-pass filter generates a contour compensation signal from an input signal (an input image signal), which is obtained from an image pickup of an object, and outputs the contour compensation signal to the accumulator. The input signal entered to the retarder is delayed for arbitrary seconds, and then entered to the accumulator.

The accumulator generates a contour-compensated signal by adding the contour compensation signal to the input signal entered from the retarder.

When the input signal is entered to the contour compensation circuit, the input signal is branched, and then entered to each of the contour compensation signal generator and the retarder.

The contour compensation circuit, finally, generates the contour-compensated signal after the processing of the input signal in the contour compensation signal generator, the retarder, and the accumulator. Thus, the image, in which the contour of the object is emphasized, is displayed on an image signal display device (hereinafter indicated as display device) based on the contour-compensated signal.

Here, the relation between the brightness level (signal level) at the time of contour compensation and the position in the display device is shown in FIG. 11.

FIG. 11A indicates the change of the brightness level of the contour region on the display device without the contour compensation.

FIG. 11B indicates the change of the brightness level of the contour-emphasized region on the display device after performing the contour compensation.

In other words, FIG. 11A shows the change of the brightness level of the contour region, which will be emphasized by the contour compensation, on the display device, before adding the contour compensation signal to the input signal (image signal) FIG. 11B shows the change of the brightness level of the contour-emphasized region on the display device after adding the contour compensation signal to the input signal (image signal)

In this FIG. 11A and FIG. 11B, the maximum level (Lmax) is a maximum brightness value (upper limit) that can be displayed (indicated) on the display device. The minimum level (Lmin) is a minimum brightness value (lower limit) that can be displayed (indicated) on the display device.

Additionally, the signal shown in the circle indicated with a dot-dash line corresponds to the contour compensation signal at about a time (n+m). $X_{n+m}$ is a signal level of the display device driven by the input signal at the time (n+m). $h(x_{n+m})$ is a signal level of the display device driven by the contour-compensated signal, which is generated at the time (n+m).

Here, these signals are generated by utilizing an out-of-green method. In this out-of-green method, G (Green) signal is obtained from the input signal (input image signal) by utilizing a high-pass filter, which allows to pass the high-region of the G (green) of RGB that is the three primary colors of the color. Then, the correction of R (Red) signal and B (blue) signal, which are contained in the input signal, is performed by utilizing the obtained G (Green) signal as standard. Hereinafter, this G (Green) channel is indicated as standard channel.

This out-of-green method is widely used when the display of the image on the display device is performed by utilizing three-sensor pickup method(three image device system). That is, this out-of-green method is used when the image is displayed on the display device by utilizing 3 pixels, R signal (R pixels) G signal (G pixels), and B signal (B pixels), of three image device system.

In this out-of-green method, since the color of G (green) gives strong influences on the enhancement of the outline of the object in the image, the color of G (green) is used as standard.

In other words, in the contour compensation utilizing the difference of a luminosity level, since the enhancement of the outline of the object is affected by the brightness of the color of G (Green), the color of G (Green) is used as the standard.

In the conventional contour compensation circuit, as shown in FIG. 11B, if the image display is performed based on the contour-compensated signal, the required brightness level of the display device may exceed the maximum level (shown by dot-dash line). Here, as shown in FIG. 11B, since the region exceeding limit level cannot be displayed at the projected brightness, the region exceeding limit level (maximum level) is commonly referred to as "clip (white clip)". When this clip arises, the region near the boundary of the object in the image seems to have colored. This phenomenon as a result of the clip is referred to as "false coloring phenomenon".

Generally, the wave profile of the contour compensation signal changes by turns from plus to minus or from misus to pluse. Thus, the sum total of the contour compensation signal is zero.

If one side of the contour compensation signal exceeds the limit of the display device and other side of the contour compensation signal does not exceeds the limit of the display device, the sum total of the contour compensation signal is not equal to zero.

In this case, the signal level of the region near the boundary of the object in the image may be changed and the region near the boundary seems to have colored.

Moreover, when the image pickup of the object is performed using the four pixel offset method utilizing the out-of-green method, the unfavorable problems may occur. As examples of this unfavorable problems, the long processing time for the processing of the image signal, and the requirement of the large hardware size of the circuit, are cited.

Here, in the four pixel offset method, the image pickup and display is performed using the device, which handles the image by utilizing input signal composed of R (Red) channel, G1 (Green 1) channel, B (Blue) channel, and G2 (Green 2) channel.

In this device, the pixels of G1 (Green 1) and the pixels of G2 (Green 2) are arrayed so that the position of each pixel of G1 (Green 1) is displaced in the horizontal and the vertical direction with respect to each pixel of G2 (Green 2). Here, the amount of the displacement is ½ of a pixel pitch.

Thereby, the display device adopting this arrangement has an improved resolution.

As reasons described above, a method and program for performing the contour compensation, a circuit for processing an image signal in order to perform the contour compensation, and an image signal display device adopting the contour compensation circuit have been required.

SUMMARY OF THE INVENTION

The present invention relates to a contour compensation circuit that generates a contour-compensated signal, by which a signal level of a contour of the object is emphasized, from an image signal obtained by an image pickup of an object. In this circuit, the generation of the contour-compensated signal is performed regarding one channel of channels that consists the image signal as a standard channel, and the generation of contour-compensated signal is performed in order to prevent the occurrence of a colored edge on a contour of the object, that are caused when the contour of the object is emphasized.

This contour compensation circuit includes a reverse gamma controller, a contour compensation signal generator, a control signal generator, a calculator, a contour compensation signal retarder, and a reverse gamma signal retarder.

The reverse gamma controller performs a reverse gamma control on the standard channel, and obtains a liner standard channel. The contour compensation signal generator generates a contour compensation signal from the liner standard channel. The control signal generator computes a comparative value from the liner standard channel and the contour compensation signal, and generates an evaluation value from a comparison between the comparative value and a threshold value. Then, the control signal generator generates a plurality of delayed evaluation values by the delay of the evaluation value, and selects the minimum value from among the evaluation value and delayed evaluation values, and output the selected minimum value as a control signal. The calculator computes the contour-compensated signal based on a contour compensation signal, and the control signal, and the liner standard channel. The contour compensation signal retarder receives the contour compensation signal from the contour compensation signal generator, and supplies the contour compensation signal to the calculator with delay. The reverse gamma signal retarder, which receives the liner standard channel from the reverse gamma controller, and supplied the liner standard channel to the calculator with delay.

In this contour compensation circuit, the control signal generator computes the evaluation value based on formula (1), when the comparative value exceeds a maximum level of a display device, $$\text{evaluation value} = (\text{maximum level} - \text{liner standard channel})/\text{contour compensation signal} \quad (1)$$

the control signal generator computes the evaluation value based on formula (2), when the comparative value less than a minimum level of a display device, $$\text{evaluation value} = (\text{minimum level} - \text{liner standard channel})/\text{contour compensation signal} \quad (2)$$

the control signal generator set the evaluation value to 1, when the comparative value less than a maximum level of a display device and the comparative value exceeds a minimum level of a display device. Here, the maximum level means that the maximum level of the signal that can be displayed on a display device, and the minimum level means that the minimum level of the signal can be displayed on the display device.

BRIEF DESCRIPTION OF THE DRAWINGS

FIG. 3 is an explanatory view explaining the four-pixel offset method.

FIG. 8 is an explanatory view showing the profile of the signal, which is obtained by the processing in the signal processor of the camera signal processing device.

DETAILED DESCRIPTION OF THE PREFERRED EMBODIMENTS

The preferred embodiment of the present invention will be explained with reference to the attached drawings.

The contour compensation circuit 1 according to the present invention generates a contour compensation signal from the image signal obtained by an image pickup of an object. This generation of the contour compensation signal is performed in order to display the object, in which the contour of the object is emphasized, in the image displayed on the display device.

Then, the contour compensation circuit 1 generates a contour-compensated signal, by which the display device displays the contour strengthened object, from the contour compensation signal and the image signal.

In this occasion, the contour compensation circuit 1 regards one of the channels of image signals (for example, G channel from among channels of RGB) as a standard channel, and generates a contour compensation signal from the standard channel. Then, the contour compensation circuit 1 compares the contour compensation signal with a threshold value and obtains a coefficient, which is obtained in compliance with the result of the comparison. Next, the contour compensation circuit 1 adjusts the degree of the contour compensation signal by performing a multiplication between the coefficient and the contour compensation signal. Then the contour compensation circuit 1 generates contour-compensated signal from the image signal and the adjusted contour compensation signal.

Thereby, the image of the object is displayed on the display device in the condition that the contour of the object is emphasized and in the condition that the boundary of the object is not colored edge.

Here, the image signal and the contour-compensated signal are the signal used for indicating the image of the object on the display device, respectively.

As described above, the contour compensation circuit 1 according to the present invention regards the one of the channels from among the image signals, i.e. the contour compensation circuit 1 regards one of the channels from among the R channel, G channel, and B channel, as the standard channel, which is used for the contour compensation. Then the compensation circuit 1 generates the contour compensation signal based on the standard channel.

FIRST EMBODIMENT

Construction Of The Contour Compensation Circuit

Figure 1:
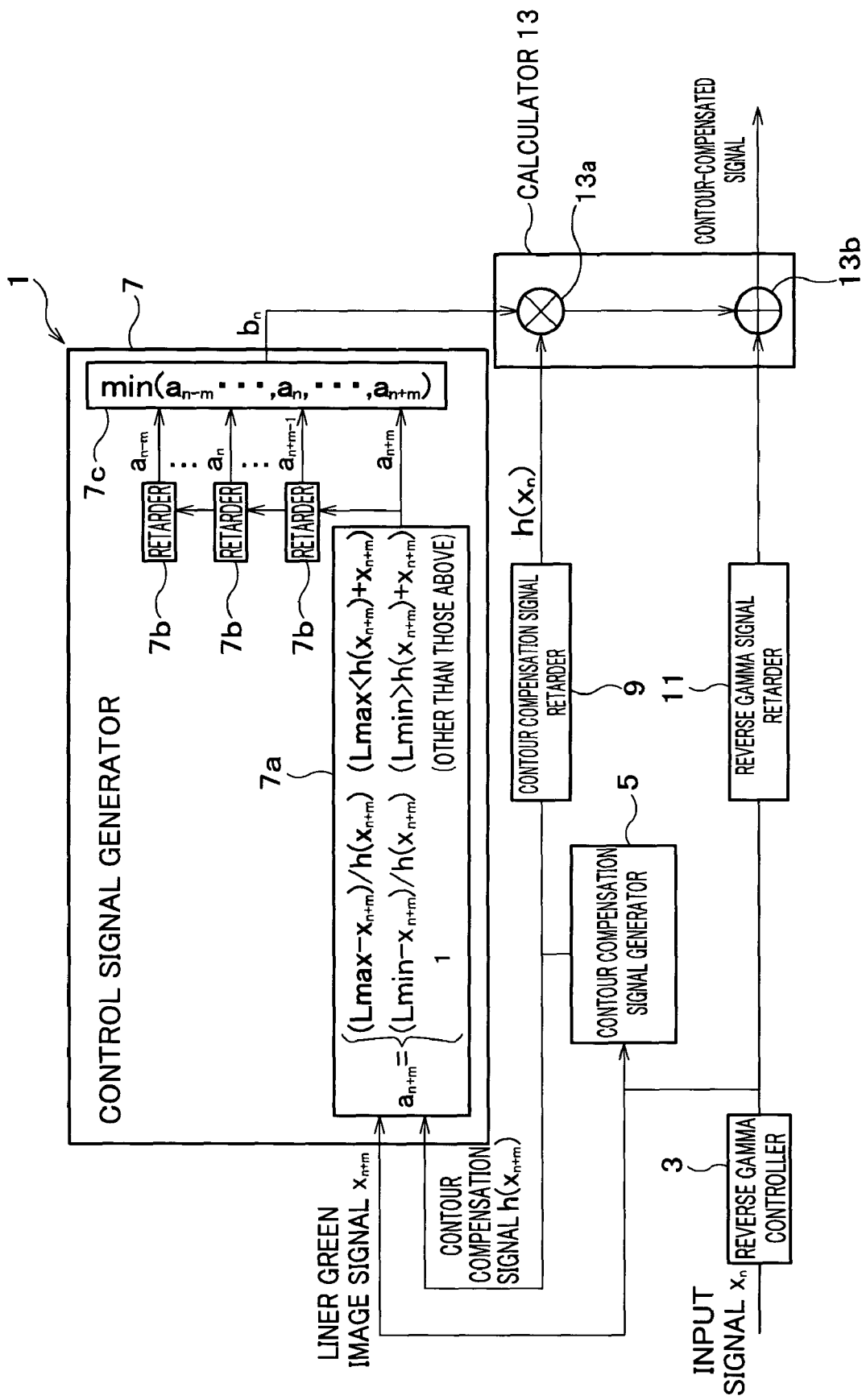
FIG. 1 is a block diagram of the contour compensation circuit.

As shown in FIG. 1, the contour compensation circuit 1 has a reverse gamma controller 3, a contour compensation signal generator 5, a control signal generator 7, a contour compensation signal retarder 9, a reverse gamma signal retarder 11, and a calculator 13.

The reverse gamma controller 3 performs the reverse gamma control on the nonlinear image signal, which is obtained by the gamma control of an image signal.

Here, the reverse gamma control is a processing to be performed in order to adjust the brightness of the image on the display device. That is, this reverse gamma control is performed in order to obtain a liner image signal from a nonlinear image signal, which is obtained by a gamma control on the image signal. In the reverse gamma controller 3, therefore, the liner image signal is obtained from the nonlinear image signal.

When the image pickup of the object is performed by using the three image device system, the obtained image signal is composed of three channels (R, G, B).

In the present invention, the image signal to be entered to the reverse gamma controller 3 may contain R(Red) image signal, G(Green) image signal, and B(Blue) image signal. In this case, the reverse gamma controller 3 generates a liner R(Red) image signal, a liner G(Green) signal, and a liner B(Blue) signal.

Then, the reverse gamma controller 3 regards the liner G (Green) image signal from among the liner image signals (the liner R(Red) image signal, the liner G(Green) signal, and the liner B(Blue) signal) which are generated by the gamma control, as the standard channel. Then, the reverse gamma controller 3 outputs the standard channel (liner G (Green) image signal) to the contour compensation signal generator 5, the control signal generator 7, and the reverse gamma signal retarder 11, respectively.

The reverse gamma controller 3, additionally, outputs the remaining liner image signals (the liner R (Red) image signal and the liner B (Blue) image signal) to the reverse gamma signal retarder 11.

Hereinafter, the liner G (Green) image signal is indicated as $X_{n+m}$. Here, n is the time an image signal was entered. As for n+m, n+m is the time after a time m from the time n.

The contour compensation signal generator 5 generates the contour compensation signal from the liner G (Green) image signal entered from the reverse gamma controller 3.

The contour compensation signal to be generated in the contour compensation signal generator 5 is a signal, which has substantially sinusoidal waveform and which has a same peak value (maximum and minimum value). DC-level (DC components) of the signal as a whole is zero.

Hereinafter, the contour compensation signal to be generated in the contour compensation signal generator 5 is indicated as $h(x_{n+m})$. Here, n is the time an image signal was entered. As for n+m, n+m is the time after a time m from the time n. $h(x_{n+m})$ is a contour compensation signal at the time (n+m).

The control signal generator 7 obtains a comparative value by adding the contour compensation signal $h(x_{n+m})$, which is entered from the contour compensation signal generator 5, to the liner G (Green) image signal, which is entered from the reverse gamma controller 3. Then, the control signal generator 7 compares the comparative value with a threshold value, and generates (outputs) an evaluation signal based on the comparison result.

The control signal generator 7 has an evaluation-signal generator 7a, a retarder 7b, and a control signal selector 7c.

The control signal generator 7a generates a control signal from the liner G (Green) image signal $(x_{n+m})$ To be more precise, the control signal generator 7a subtracts the liner G (Green) image signal $(x_{n+m})$ from the maximum level (Lmax) of the signal level of the display device, when the comparative value exceeds the maximum level of the signal level of the display device. Then, the control signal generator 7a regards the obtained value as the evaluation signal $(a_{n+m})$ In this case, the evaluation signal $(a_{n+m})$ is shown as following formula.

$$a_{n+m}=(L_{max}-x_{n+m})/h(x_{n+m}), L_{max}<(h(x_{n+m})+x_{n+m}) \quad (1)$$

The control signal generator 7a, on the other hand, subtracts the liner G image signal $(x_{n+m})$ from the minimum level (Lmin) of the signal level of the display device, when the comparative value is under the minimum level of the signal level of the display device. In this case, the evaluation signal $(a_{n+m})$ is shown as following formula.

$$a_{n+m}=(L_{min}-x_{n+m})/h(x_{n+m}), L_{min}>(h(x_{n+m})+x_{n+m}) \quad (2)$$

The control signal generator 7a sets the control signal $(a_{n+m})$ as "1", when the comparative value is under the maximum level of the signal level of the display device and exceeds the minimum level of the signal level. That is, the control signal $(a_{n+m})$ is set to 1 when the comparative value is between the maximum level and the minimum level. In this case, the evaluation signal $(a_{n+m})$ is shown as following formula.

$$a_{n+m}=1, L_{max}>(h(x_{n+m})+x_{n+m} \text{ or } L_{min}<(h(x_{n+m})+x_{n+m}) \quad (3)$$

The retarder 7b delays the evaluation signal $(a_{n+m})$ entered from the control signal generator 7a.

In the control signal generator 7, a plurality of retarders 7b are provided so that the evaluation signal $(a_{n+m})$ may be delayed gradually (from $a_{n+m}$ to $a_{n-m}$)

The control signal selector 7c selects the most minimum value from among the evaluation signal $(a_{n+m})$, which is entered from the control signal generator 7a, and the delayed evaluation signals $(a_{n+m-1}, \ldots, a_{n-m})$, which are entered from each of the retarder 7b. Then, the control signal selector 7c outputs the selected value as a control signal $(b_n)$ That is, in the present invention, the control signal selector 7c selects the control signal $(b_n)$ from the delayed evaluation signals $(a_{n-m}, \ldots, a_n, \ldots, a_{n+m})$ and the evaluation signal $(a_{n+m})$.

When the control signal generator 7 is constructed by a plurality of filters, the evaluation signals of the same numbers as the number of filters are entered to the control signal selector 7c. In this case, the unfavorable evaluation signal, which cannot control the contour compensation signal so that the signal level of the display device does not exceed the maximum level of the display device, may be entered to the control signal selector 7c. In the present invention, therefore, the selection of the control signal ($b_n$) is performed in the control signal selector.

That is, the control signal selector 7c selects the minimum control signal ($b_n$) from among the evaluation signals ($a_{n+m-1}, \ldots, a_{n-m}$) in order to keep the sum total of the contour compensation signal at zero. In other words, the control signal selector 7c controls the control signal ($b_n$) to the minimum value in order to prevent the occurrence of the unfavorable effects.

The contour compensation signal retarder 9 delays the output of the contour compensation signal ($h(x_{n+m})$) entered from the contour compensation signal generator 5. The delay time is same as the time required in the processing in the control signal generator 7. Here, the contour compensation signal ($h(x_{n+m})$) supplied from the contour compensation signal retarder 9 is indicated as $h(x_n)$. That is, since n is the time an image signal was entered, $h(x_n)$ is contour compensation signal, which must be added to the liner G (Green) image signal that was entered to the reverse gamma controller 3 at the time (n).

The reverse gamma signal retarder 11 delays the output of the liner image signals (the liner R (Red) image signal, the liner G (Green) image signal, and the liner B (Blue) image signal) entered from the reverse gamma controller 3, and then output the liner image signals to the calculator 13.

That is, this delay processing is performed in order to synchronize the input signal (input image signal) with the adjusted contour compensation signal generated in the calculator 13. Here, the delay time is the same time required at the processing in the control signal generator 7 and multiplier 13a.

The calculator 13 has a multiplier 13a and an accumulator 13b, and generates an adjusted contour compensation signal from the control signal ($b_n$) entered from the contour signal selector 7c and the contour compensation signal ($h(x_n)$) entered from the contour compensation signal retarder 9. Then, the calculator 13 (the multiplier 13a) generates the adjusted contour compensation signal.

The multiplier 13a performs the multiplication between the contour compensation signal ($h(x_n)$) and the control signal ($b_n$), and obtains the adjusted contour compensation signal ($b_n \cdot h(x_n)$)

The accumulator 13b adds the adjusted contour compensation signal ($b_n \cdot h(x_n)$) to the liner G (Green) image signal. Thus, the image signals (a contour-compensated signal) which includes the G (Green) signal (channel) whose intensity was adjusted, are supplied from the multiplier 13a.

Processing in the Contour Compensation Circuit

Figure 2:
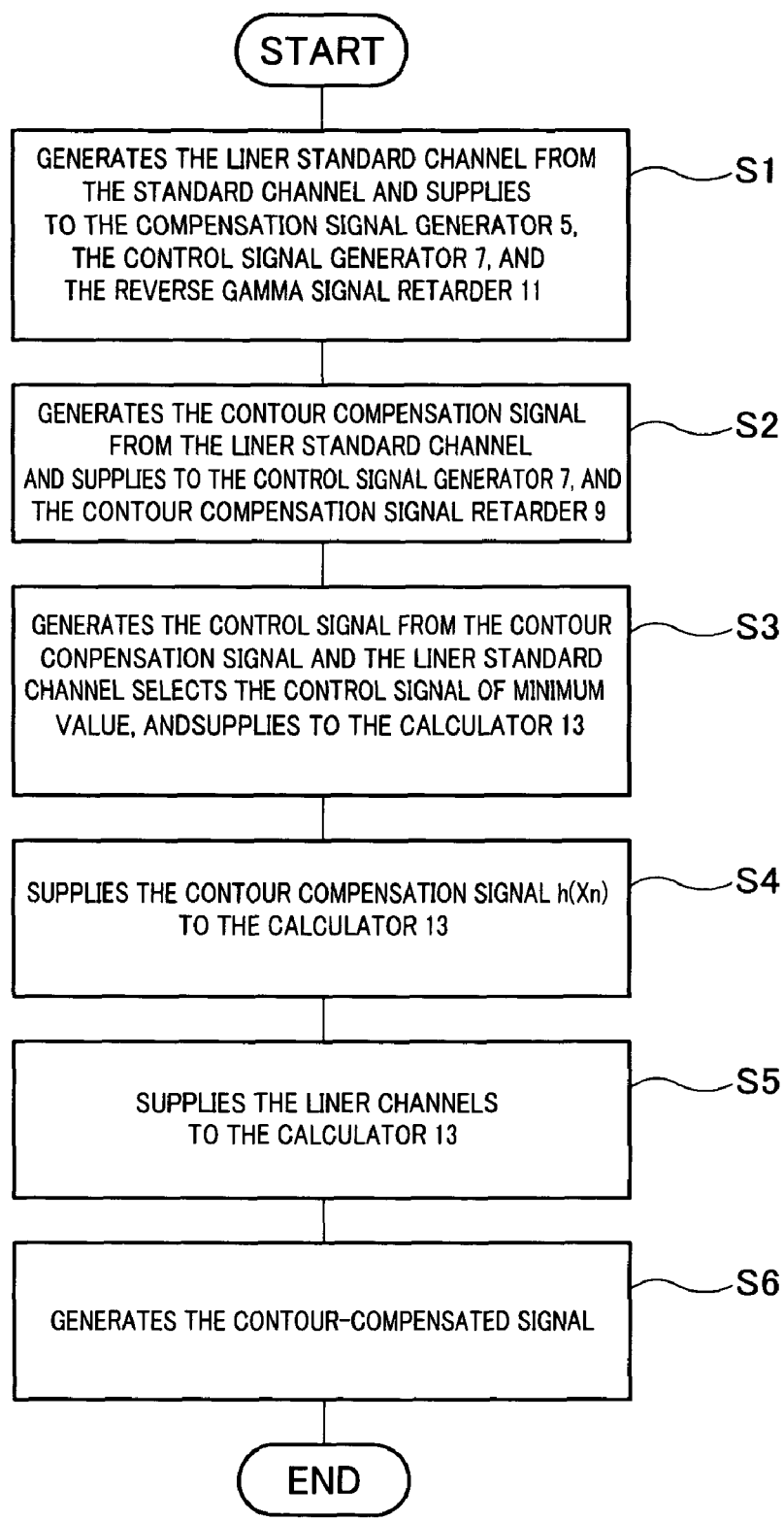
FIG. 2 is a flow chart showing the flow of the processing performed in the contour compensation circuit.

Next, the processing performed in the contour compensation circuit 1 will be explained with reference to the flow chart shown in FIG. 2.

When the image signal is entered to the reverse gamma controller 3, the image signal is converted into the liner image signal.

Then, the reverse gamma controller 3 regards the liner G (green) channel contained in the image signal as the standard channel (liner standard channel), and output the liner standard channel (the liner G (Green) signal($x_{n+m}$)) to the contour compensation signal generator 5, the control signal generator 7, and the reverse gamma signal retarder 11 (STEP 1).

The reverse gamma controller 3, in this occasion, outputs the channels (R channel and B channel) other than the G (Green) channel to the reverse gamma signal retarder 11.

Next, the contour compensation signal ($h(x_{n+m})$) at the time of the time (n+m) is generated in the contour compensation signal generator 5. The generated contour compensation signal ($h(x_{n+m})$) is supplied to the control signal generator 7 and the contour compensation signal retarder 9 (STEP 2).

Then, the evaluation signal ($a_{n+m}$) is generated in consideration of the liner standard channel ($x_{n+m}$) and the contour compensation signal ($h(x_{n+m})$). This evaluation signal ($a_{n+m}$) is supplied to the retarder 7b and the control signal selector 7c, respectively.

The evaluation signal ($a_{n+m}$) is delayed in each of the retarders 7b, and then each of the delayed evaluation signals ($a_{n-m}, \ldots, a_n, \ldots, a_{n+m}$) are entered to the control signal selector 7c. The control signal selector 7c selects the smallest value from among the evaluation signal ($a_{n+m}$) and the delayed evaluation signals ($a_{n-m}, \ldots, a_n, \ldots, a_{n+m}$), and outputs the selected value to the calculator 13 as the control signal ($b_n$) (STEP 3).

The contour compensation signal ($h(x_{n+m})$), which is generated in the contour compensation signal generator 5 and is supplied to the contour compensation signal retarder 9, is delayed in the contour compensation signal retarder 9 by a predetermined time. Then, the contour compensation signal ($h(x_n)$) is entered to the calculator 13 (STEP 4). In other words, the output of the contour compensation signal ($h(x_n)$) entered to the contour compensation signal retarder 9 is delayed for arbitrary seconds.

The liner input signals (the liner R (Red) channel, the liner B (Blue) channel, and the liner G (Green) channel) are delayed in the reverse gamma signal retarder 11, and then entered to the calculator 13 (STEP 5).

The multiplier 13a performs the multiplication between the control signal ($b_n$) and the contour compensation signal ($h(x_n)$), and obtains the adjusted contour compensation signal ($b_n \cdot h(x_n)$) Then, the accumulator 13b performs the accumulation between the obtained adjusted contour compensation signal ($b_n \cdot h(x_n)$) and the liner G (Green) channel, and obtains a corrected liner G (Green) image signal.

Thereby, the contour-compensated signal consisting of the liner R image signal, the liner B image signal, and the corrected liner G image signal is generated (STEP 6).

Thus, in the display device, the image of the object is displayed based on the contour-compensated signal.

In the present invention, each processing in the STEP 3, STEP 4, and STEP 5 are simultaneously performed.

SECOND EMBODIMENT

In the above described embodiment, the image signal obtained by utilizing the three image device system is handled in the contour compensation circuit 1. But the image signals that can be handled in the contour compensation circuit 1 are not limited to this. The image signal obtained by utilizing the four pixel offset method may be adoptable in this contour compensation circuit 1.

Therefore, the processing performed in the contour compensation circuit 1, which handles the image signal obtained by utilizing the four pixels offset method, will be explained.

When the image pickup of the object is performed utilizing the four pixels offset method, the obtained image signal is composed of four channels (R, G1, B, and G2).

In the present embodiment, therefore, the image signal entered to the reverse gamma controller 3 consists of the image signals of R (Red), G1 (Green 1), B (Blue), and G2 (Green 2).

Thereby, in the reverse gamma controller 3, the liner R (Red) image signal, the liner G1 (Green 1) image signal, the liner B (Blue) image signal, and the liner G2 (Green 2) image signal are generated.

In this occasion, the reverse gamma controller 3 regards the liner G (Green) image signal obtained from the image signal of G1 (Green 1) as a first standard channel, and regards the liner G (Green) image signal obtained from the image signal of G2 (Green 2) as a second standard channel.

Then, the reverse gamma controller 3 outputs the first standard channel and second standard channel to each of the contour compensation signal generator 5, the control signal generator 7, and the reverse gamma signal retarder 11. The reverse gamma controller 3, additionally, outputs the liner R (Red) image signal and the liner B (Blue) image signal to the reverse gamma signal retarder 11.

The contour compensation signal generator 5 generates a first contour compensation signal and a second contour compensation signal to each of the first standard channel and second standard channel.

The control signal generator 7 generates control signals (a first control signal and a second control signal) from each of the standard channels (a first standard channel and a second standard channel).

The calculator 13 generates the adjusted contour compensation signals (a first adjusted contour compensation signal and a second adjusted contour compensation signal), and combine these adjusted contour compensation signals with the liner G (Green) signals (the liner G1 (Green 1) signal and the liner G2 (Green 2) signal). Thereby, the calculator 13 generates the contour-compensated signal including a first contour-compensated signal and a second contour-compensated signal.

To be more precise, the first contour-compensated signal is generated from the liner G1 (Green 1) signal and the first adjusted contour compensation signal, and the second contour-compensated signal is generated from the liner G2 (Green 2) signal and the second adjusted contour compensation signal. Then, the contour-compensated signal including a first contour-compensated signal and a second contour-compensated signal is generated.

Four Pixel Offset Method

Next, a four pixel offset method will be explained with reference to FIG. 3.

In the four pixels offset method, only G (Green) signal from among the RGB signal, which is the three primary colors of an image signal, is displayed by using two pixels. In this case, the image to be displayed on the display device is indicated by using the R pixel, B pixel, G1 pixel, and G2 pixel, which are arrayed on the display device as the arrangement shown in FIG. 3.

In the four pixel offset method, the G1 pixels and R pixels are arrayed by turns on the first line from the top, and the B pixels and G2 pixels are arrayed by turns on the second line from the top. In the present invention, the arrangement of each pixel on the third line from the top is the same as that of the first line from the top, and the arrangement of each pixel on the fourth line from the top is the same as that of the second line from the top.

By arranging each pixels like this manner, one color is expressed by four adjoining pixels. In the present embodiment, for example, one color is expressed from pixels of G1 and R, which are arranged at the leftside in the first line from the top, and pixels of B and G2, which are arranged at the leftside in the second line from the top. Additionally, another color is expressed from pixels of B and G2, which are arranged at the leftside in the second line from the top, and pixels of G1 and R, which are arranged at the leftside in the third line from the top, Thereby, in the present invention, the numbers of the scanning line can be increased in false than the conventional displaying method, in which one color is expressed by three pixels.

Contour Compensation Signal

Next, the contour-compensated signal, which is actually generated, will be explained with reference to FIG. 4.

Figure 4:
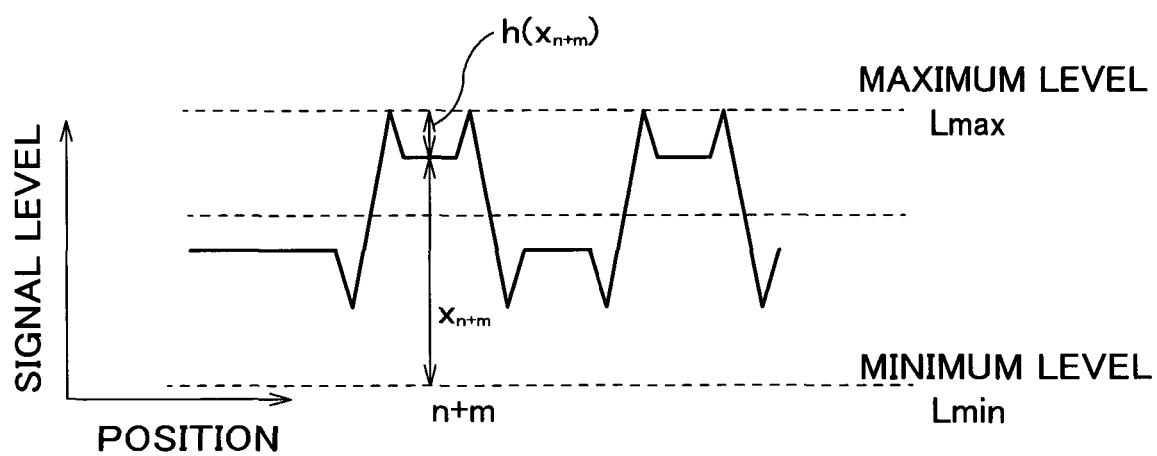
FIG. 4 is an explanatory view showing the contour compensation signal.
Figure 5:
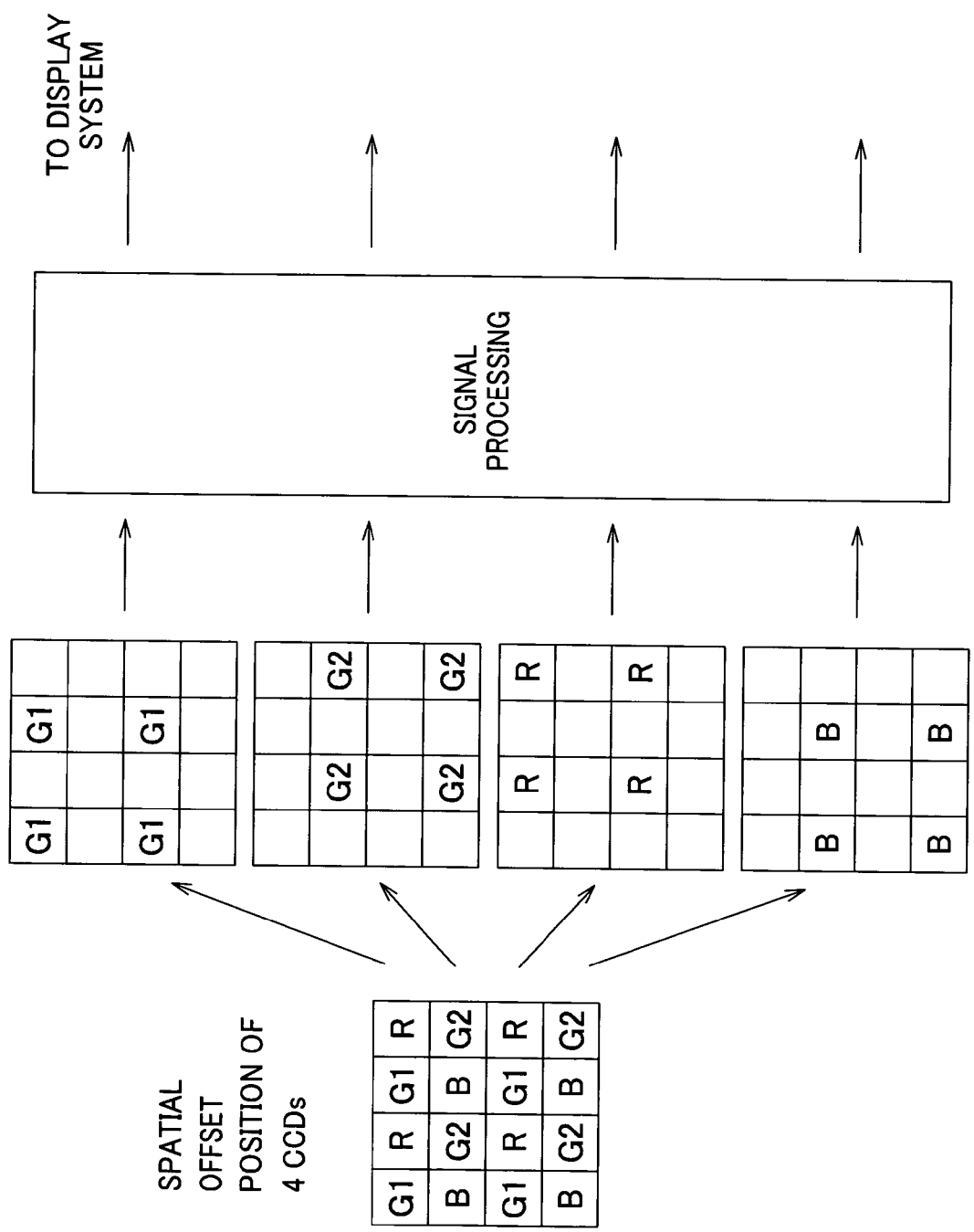
FIG. 5 is an explanatory view explaining the interpolation adopted in the four-pixel offset method

As shown in FIG. 4, the signal level (brightness level) at the point (n+m) on the display device never exceeds the maximum level (Lmax), when the image display of the object is performed based on the contour-compensated signal.

That is, when image is displayed on the display device in accordance with contour-compensated signal, the signal level falls within the permissible range (between the maximum level (Lmax) and the minimum level (Lmin)). Thus, the occurrence of the "clip" can be prevented. Thereby, the image of the object without colored edge can be displayed on the display device even if the contour compensation is performed.

In the present invention, as described above, the generation of the contour compensation signal is performed by utilizing the image signal of G (Green) from among the image signals, which are obtained by the image pickup of the object.

The contour compensation circuit 1 may generate the contour compensation signals for all the channels, which are contained in the image signal (input image signal).

In this case, the contour compensation signal of R (Red) the contour compensation signal of G (Green), and the contour compensation signal of B (Blue) are separately generated, and are added to each of the liner R (Red) image signal, the liner G (Green) image signal, and the liner B (Blue) image signal, respectively. Thereby, the contour-compensated signal is generated.

In the present invention, the contour compensation circuit 1 handles all the channels included in an image signal. But, the contour compensation circuit may handle only some of the channels included in the image signal. For example, the contour compensation circuit, in which only G (Green) image signal is entered to the reverse gamma controller and the contour-compensated G (Green) signal is supplied from the calculator 13, may be adoptable.

Camera (Image) Signal Processor

The contour compensation circuit according to the present invention may be applied to a camera (image) signal processor, which adopts four-sensor pickup method.

First, a configuration of a signal processor of the camera signal processor will be explained.

The main functions of the signal processor are mainly composed of: a format conversion function; an image correction function; and a HDTV-output (high-definition television output) function.

The image correction is performed in an image corrector. In this image corrector, a gain level/black level adjustment, a contour compensation, a correction of the defect of pixels on CCD, a correction of the boundary of the block on CCD, and a gamma control, are performed.

In this camera signal processor, a four pixel offset method is used when performing an image pickup or the display of an image. Thus, in order to curb the enlargement of the hardware size, the processing of the signal is performed by utilizing the interpolation without increasing the number of pixels.

In the signal processor of the camera signal processor, the contour compensation is performed on all channels, separately. If the components of the contour differ in each channel, the influence of the nonliner processing of the image level may arise on the image displayed on the display device. That is, part of the image displayed on the display device seems to have colored.

Here, the nonliner processing (the white clip processing), which is a cause of this false coloring phenomenon, will be explained with reference to FIG. 6.

Figure 6:
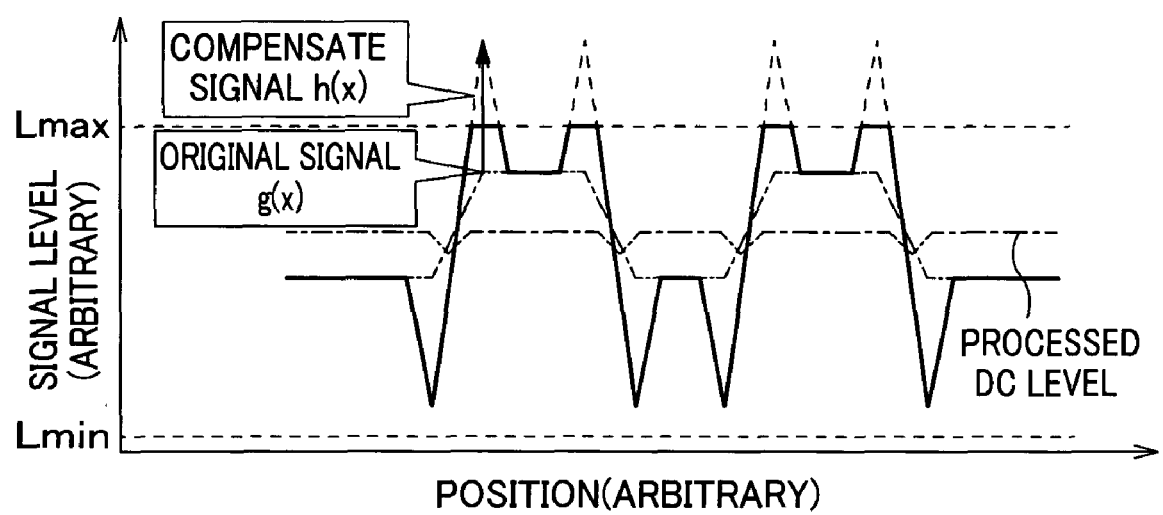
FIG. 6 is an explanatory view showing the white clip processing.

As shown in FIG. 6, the upper-parts in the contour compensation signals (the compensation signal (h(x)) shown in FIG. 6) are cut off because of the limitations of display device. Therefore, the signal level of low-pass region among the image region of the high spatial frequency becomes less than the original input signal.

In order to prevent the occurrence of this problems, the contour compensation circuit 1A (shown in FIG. 7), which can perform the contour compensation in consideration of the total nonlinear processing, is provided on the camera signal processor.

Figure 7:
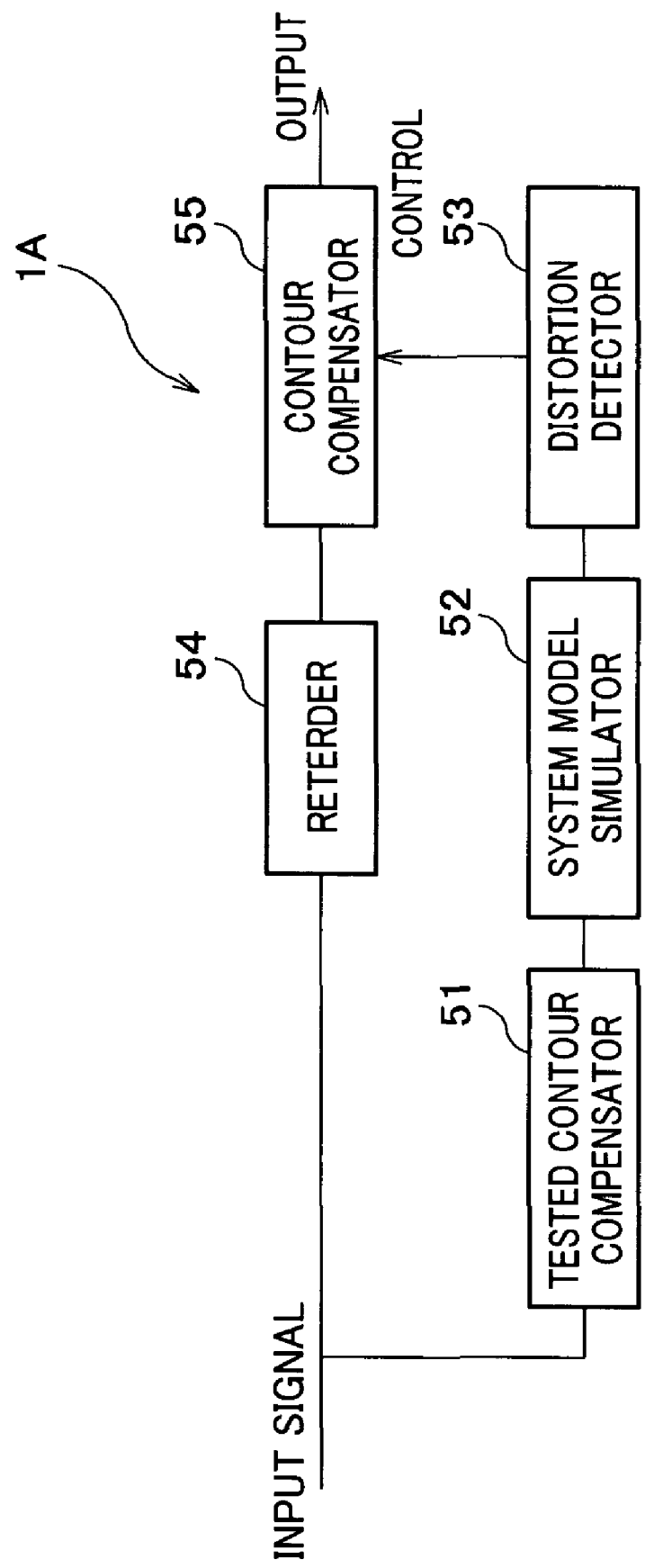
FIG. 7 is a block diagram of the contour compensation circuit of another embodiment.

As shown in FIG. 7, the contour compensation circuit 1A has a tested contour compensator 51, which performs the artificial nonlinear processing on the input signal (input) The distortion detector 53 of the contour compensation circuit 1A detects a distortion, which is caused as a result of the processing by the tested contour compensator 51. The contour compensator 55 performs the contour compensation on the signal entered through the reterder 54 based on the distortion detected by the distortion detector 53.

The contour compensation circuit 1A can suitably control the contour compensation signal by performing a simulation. This control based on a simulation is superior to the control performed by using input signal only.

Here, it is preferable that each of the display devices has a function to perform a contour compensation, when a plurality of display device is used at the same time. In the present invention, since the display to be used is identified, the contour compensation circuit 1A is only provided to the camera signal processor.

In the camera signal processor (not shown), in order to prevent the occurrence of the false coloring phenomenon, which is caused by the white clip or black clip, a system model simulator equips a white/black clip circuit (not shown).

The distortion detector 53 and contour compensator 55 makes a gain (a(x)) of the contour compensation signal to less or equal to 1 (a(x)≦1). Then, the distortion detector 53 and contour compensator 55 obtains a minimum value of the gain (a(x)) in order to prevent the occurrence of the clip on each pixel, which are placed within the filter-taps, and handles this obtained minimum value of the gain (a(x)) as a control amount within the filter-tap.

A profile of the signal, which is obtained by the processing on the signal processor of the camera signal processor, is shown in FIG. 8. To be more precise, the wave profile of the signal which is obtained after the algorithm processing in the contour compensation circuit 1A, is shown in FIG. 8.

In FIG. 8, g(x) is a signal level at the position x on the display device of the original input signal. h(x) is a contour compensation signal at the position x. Here, the image which superimposed the sin wave on the staircase horizontal as an input as a high region component was used.

FIG. 9 shows the observation result of the variations of the low-pass components of the input image, which are obtained by passing through the low-pass filter after performing the contour compensation.

Figure 9A:
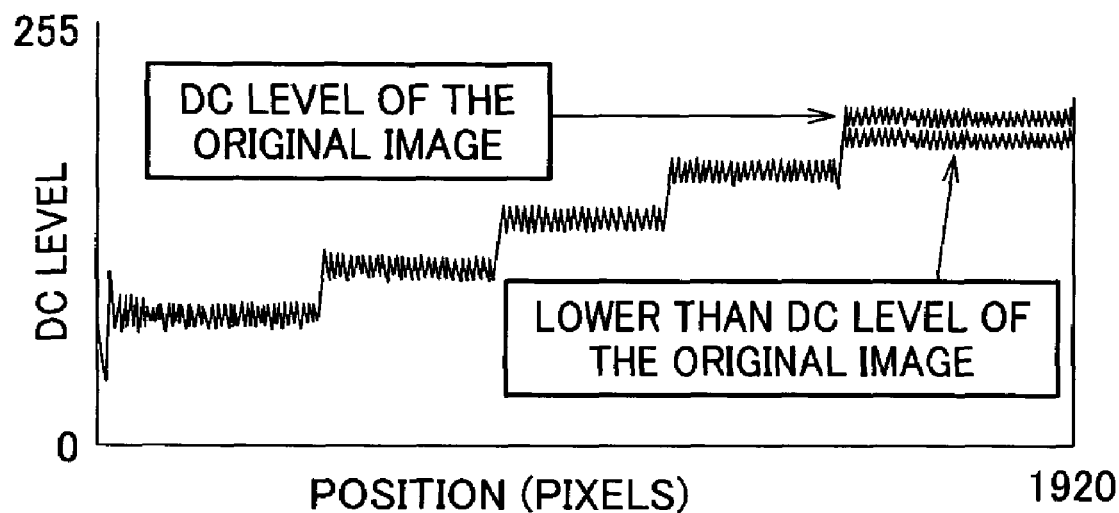
FIG. 9A is an explanatory view showing the change of the DC level of low-pass regions, wherein the contour compensation circuit is not adopted.

In FIG. 9A, each of the low-pass components of each input signal are displayed in piles. FIG. 9A shows the case where the contour compensation circuit 1A is not adopted. As shown in FIG. 9A, the image level of the image after contour compensation in the high brightness region is clipped. Thus, the image level in the high brightness region is decreased.

Figure 9B:
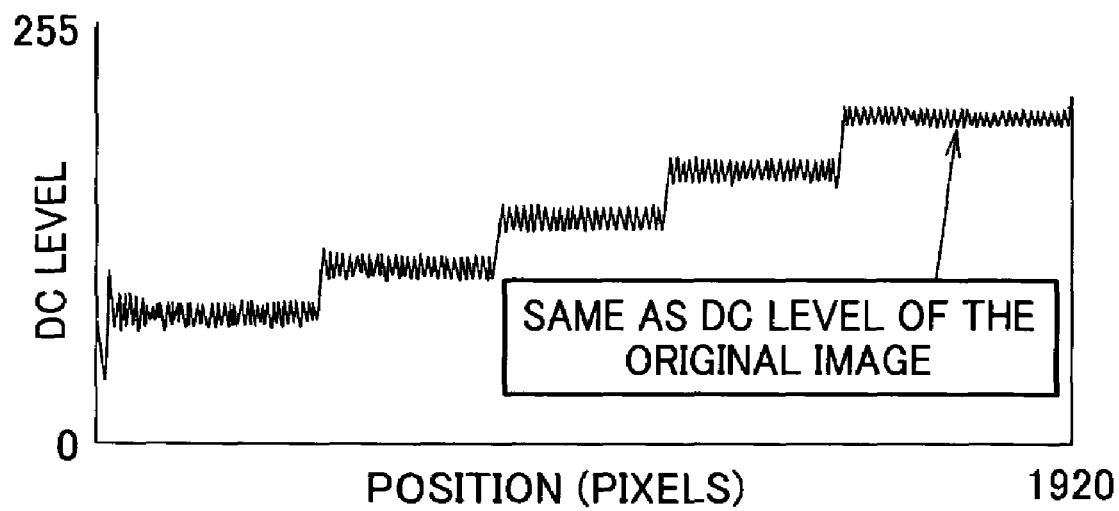
FIG. 9B is an explanatory view showing the change of the DC level of low-pass regions, wherein the contour compensation circuit is adopted.
Figure 10:
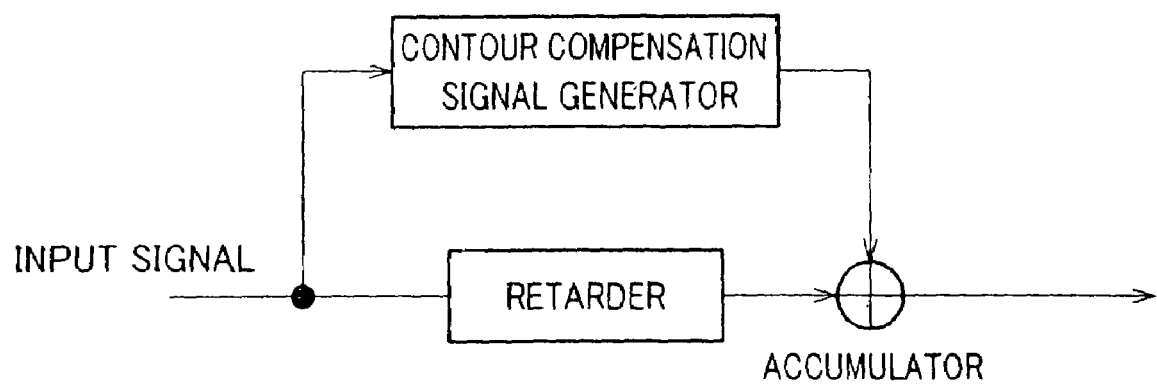
FIG. 10 is a block diagram of the conventional contour compensation circuit.
Figure 11A:
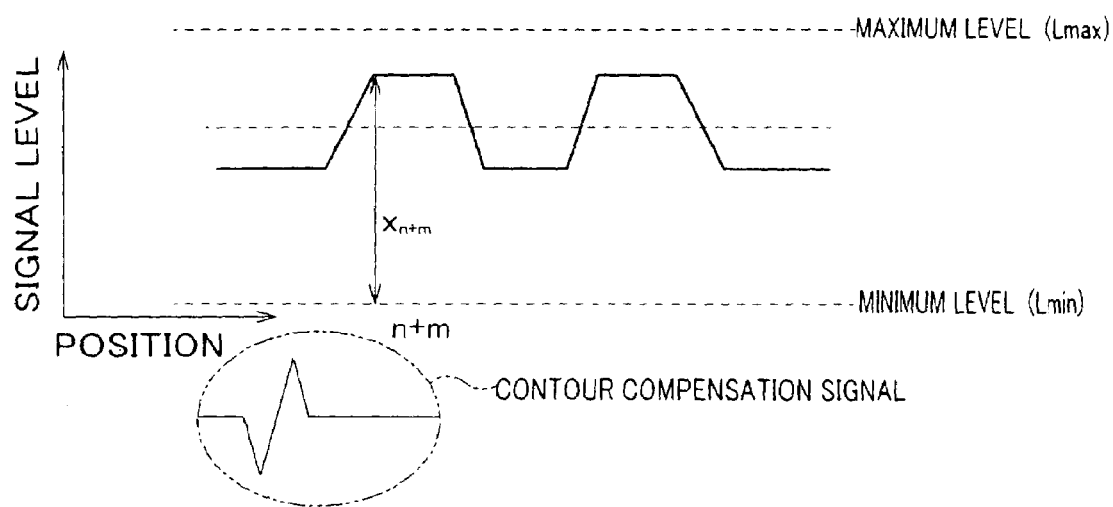
FIG. 11A is an explanatory view showing the change of the signal level of the display device without the contour compensation.
Figure 11B:
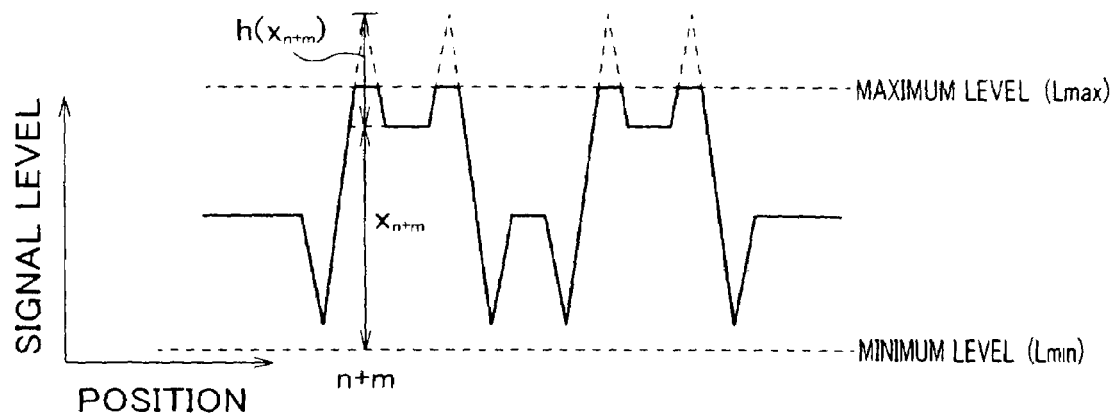
FIG. 11B is an explanatory view showing the change of the brightness level of the display device after performing the contour compensation.

On the other hand, FIG. 9B shows the case where the contour outline compensation circuit 1A is adopted. According to FIG. 9B, image signal is controlled in order to prevent the occurrence of the clip. Thus, the image level in the whole regions from the low brightness region to high brightness region agrees with the original image. Thereby, the occurrence of the colored phenomenon to be caused by the contour compensation can be controlled.

Although there have been disclosed what are the patent embodiment of the invention, it will be understood by person skilled in the art that variations and modifications may be made thereto without departing from the scope of the invention is indicated by the appended claims.

For example, it is possible to consider each operation performed in each part of the contour compensation circuit 1 as one process operation, respectively. In this case, the method for performing the contour compensation is realized by assembling each operation performed in the contour compensation circuit.

In the present embodiment, additionally, it is possible to represent each operation to be performed in each part of the contour compensation circuit 1 as one program code, respectively. In this case, the program for performing the contour compensation is realized by assembling each program code.

What is claimed is:

1. A contour compensation circuit that generates a contour-compensated signal, by which a signal level of a contour of an object is emphasized, from an image signal obtained by an image pickup of the object, wherein the generation of the contour-compensated signal is performed regarding one channel of channels that consists the image signal as a standard channel, and wherein the generation of the contour-compensated signal is performed in order to prevent an occurrence of a colored edge on the contour of the object, that are caused when the contour of the object is emphasized, and the contour compensation circuit comprising:

a reverse gamma controller, which performs a reverse gamma control on the standard channel, and obtains a liner standard channel;

a contour compensation signal generator, which generates a contour compensation signal from the liner standard channel;

a control signal generator, which computes a comparative value from the liner standard channel and the contour compensation signal, and generates an evaluation value from a comparison between the comparative value and a threshold value, and the control signal generator generates a plurality of delayed evaluation values by the delay of the evaluation value, and select a minimum value from among the evaluation value and the delayed evaluation values, and output a selected minimum value as a control signal;

a calculator, which computes the contour-compensated signal based on the contour compensation signal, and the control signal, and the liner standard channel;

a contour compensation signal retarder, which receives the contour compensation signal from the contour compensation signal generator, and supplies the contour compensation signal to the calculator with delay; and a reverse gamma signal retarder, which receives the liner standard channel from the reverse gamma controller, and supplies the liner standard channel to the calculator with delay.

2. A contour compensation circuit according to claim 1, wherein the control signal generator computes the evaluation value based on formula (1), when the comparative value exceeds a maximum level of a display device, $$\text{evaluation value} = (\text{maximum level} - \text{liner standard channel})/\text{contour compensation signal} \quad (1)$$

the control signal generator computes the evaluation value based on formula (2), when the comparative value less than a minimum level of the display device, $$\text{evaluation value} = (\text{minimum level} - \text{liner standard channel})/\text{contour compensation signal} \quad (2)$$

the control signal generator set the evaluation value to 1, when the comparative value less than the maximum level of the display device and the comparative value exceeds the minimum level of the display device, wherein the maximum level means that a maximum level of a signal that can be displayed on the display device, and wherein the minimum level means that a minimum level of the signal that can be displayed on the display device.

3. A contour compensation circuit according to claim 2, wherein the calculator including;

a multiplier, which obtains an adjusted contour compensation signal by a multiplication between the control signal entered from the control signal generator and the contour compensation signal entered from the contour compensation signal retarder; and an accumulator, which obtains the contour-compensated signal by the accumulation between the adjusted contour compensation signal and the liner standard channel.

4. A contour compensation circuit according to claim 2, wherein the image signal includes R (Red) channel, B (Blue) channel, and G (Green) channel, and wherein the reverse gamma controller regards the G (Green) channel as the standard channel, and performs a reverse gamma control on the G (Green) channel.

5. A contour compensation circuit according to claim 2, wherein the image signal includes R (Red) channel, B (Blue) channel, G1 (Green 1) channel, and G2 (Green 2) channel, and wherein the reverse gamma controller generates a first liner standard channel and a second line standard channel from the G1 (Green 1) channel and the G2 (Green 2) channel, respectively, by performing the reverse gamma control, the contour compensation signal generator generates a first contour compensation signal and a second contour compensation signal from the first liner standard channel and the second liner standard channel, respectively, the control signal generator generates a first control signal based on the first liner standard channel and the first contour compensation signal, and generates a second control signal based on the second liner standard channel and the second contour compensation signal, the calculator computes the first contour-compensated signal based on the first contour compensation signal, the first control signal, and the first liner standard channel, and computes the second contour-compensated signal based on the second contour compensation signal, the second control signal, and the second liner standard channel, the contour compensation signal retarder receives the first contour compensation signal and the second contour compensation signal from the contour compensation signal generator, and supplies them to the calculator with delay, and the reverse gamma signal retarder receives the first liner standard channel and the second liner standard channel from the reverse gamma controller, and supplies them to the calculator with delay.

6. A method for performing a contour compensation that generates a contour-compensated signal, by which a signal level of a contour of an object is emphasized, from an image signal obtained by an image pickup of the object, wherein the generation of the contour-compensated signal is performed regarding one channel of channels that consists the image signal as a standard channel, and wherein the generation of contour-compensated signal is performed in order to prevent the occurrence of a colored edge on the contour of the object, that are caused when the contour of the object is emphasized, and the method comprising the steps of:

a reverse gamma control step, in which a liner standard channel is obtained by performing a reverse gamma control on the standard channel;

a contour compensation signal generation step, in which a contour compensation signal is generated from the liner standard channel;

a control signal generation step, in which a comparative value is computed from the liner standard channel and the contour compensation signal, wherein an evaluation value is generated from a comparison between the comparative value and a threshold value, and a plurality of delayed evaluation values is generated by the delay of the evaluation value, and a control signal is generated by selecting the minimum value from among the evaluation value and delayed evaluation values, wherein the evaluation value is computed based on formula (1), when the comparative value exceeds a maximum level of a display device, $$\text{evaluation value} = (\text{maximum level} - \text{liner standard channel})/\text{contour compensation signal} \quad (1)$$

the evaluation value is computed based on formula (2), when the comparative value less than a minimum level of the display device, $$\text{evaluation value} = (\text{minimum level} - \text{liner standard channel})/\text{contour compensation signal} \quad (2)$$

the evaluation value is set to 1, when the comparative value less than the maximum level of the display device and the comparative value exceeds the minimum level of the display device, wherein the maximum level means that a maximum level of a signal that can be displayed on the display device, and wherein the minimum level means that a minimum level of the signal can be displayed on the display device;

a calculation step, in which a contour-compensated signal is computed based on the contour compensation signal, and the control signal, and the liner standard channel;

a contour compensation signal delay step, in which the contour compensation signal entered from the contour compensation signal generator is supplied to the calculator with delay; and a reverse gamma signal delay step, in which the liner standard channel entered from the reverse gamma controller is supplied to the calculator.

7. A storage medium readable by a computer, having stored thereon a program of instructions executable by the computer to operate an apparatus so that the apparatus generates a contour-compensated signal, by which a signal level of a contour of an object is emphasized, from an image signal obtained by an image pickup of the object, wherein the generation of the contour-compensated signal is performed regarding one of channels that consists the image signal as a standard channel, and wherein the generation of contour-compensated signal is performed in order to prevent the occurrence of a colored edge on the contour of the object, that are caused when the contour of the object is emphasized, and the program comprising the functions of:

a reverse gamma control function, by which a liner standard channel is obtained from the standard channel by a reverse gamma control;

a contour compensation signal generation function, by which a contour compensation signal is generated from the liner standard channel;

a control signal generation function, by which a comparative value is computed from the liner standard channel and the contour compensation signal, and an evaluation value is generated from a comparison between the comparative value and a threshold value, a plurality of delayed evaluation values is generated by the delay of the evaluation value, and a control signal is generated by selecting the minimum value from among the evaluation value and delayed evaluation values, wherein the evaluation value is computed based on formula (1), when the comparative value exceeds a maximum level of a display device, $$\text{evaluation value} = (\text{maximum level} - \text{liner standard channel})/\text{contour compensation signal} \quad (1)$$

the evaluation value is computed based on formula (2), when the comparative value less than a minimum level of a display device, $$\text{evaluation value} = (\text{minimum level} - \text{liner standard channel})/\text{contour compensation signal} \quad (2)$$

the evaluation value is set to 1, when the comparative value than a maximum level of a display device and the comparative value exceeds a minimum level of a display device, wherein the maximum level means that the maximum level of the signal that can be displayed on a display device, and wherein the minimum level means that the minimum level of the signal can be displayed on the display device;

a calculation function, in which a contour-compensated signal is computed based on the contour compensation signal, and the control signal, and the liner standard channel;

a contour compensation signal delay function, by which the contour compensation signal entered from the contour compensation signal generator is supplied to the calculator with delay; and a reverse gamma signal delay function, by which the liner standard channel entered from the reverse gamma controller, is supplied to the calculator.

8. An image signal display device that generates a contour-compensated signal, by which a signal level of a contour of the object is emphasized, from an image signal obtained by an image pickup of an object, wherein the generation of contour-compensated signal is performed in order to prevent the occurrence of a colored edge on a contour of the object, that are caused when the contour of the object is emphasized, and wherein the object is displayed based on the contour-compensated signal, the image signal display device comprising:

a contour compensation circuit of claim 2;

a gamma controller, which performs the gamma control on the contour-compensated signal supplied from the contour compensation circuit, and obtains a converted contour-compensated signal; and a display device, which displays the object based on the converted contour-compensated signal.

* * * * *